(12) United States Patent
He et al.

(10) Patent No.: US 9,997,132 B2
(45) Date of Patent: Jun. 12, 2018

(54) DATA TRANSMISSION METHOD, DATA TRANSMISSION SYSTEM AND PORTABLE DISPLAY DEVICE OF TRANSMITTING COMPRESSED DATA

(71) Applicants: BOE Technology Group Co., Ltd., Beijing (CN); Beijing BOE Optoelectronics Technology Co., Ltd., Beijing (CN)

(72) Inventors: Quanhua He, Beijing (CN); Hao Zhang, Beijing (CN); Lingyun Shi, Beijing (CN); Guangquan Wang, Beijing (CN); Jian Bo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/324,862

(22) PCT Filed: Dec. 28, 2015

(86) PCT No.: PCT/CN2015/099200
§ 371 (c)(1),
(2) Date: Jan. 9, 2017

(87) PCT Pub. No.: WO2017/020512
PCT Pub. Date: Feb. 9, 2017

(65) Prior Publication Data
US 2017/0221447 A1    Aug. 3, 2017

(30) Foreign Application Priority Data

Aug. 6, 2015   (CN) .......................... 2015 1 0478302

(51) Int. Cl.
H04N 19/156   (2014.01)
H04N 19/12    (2014.01)
(Continued)

(52) U.S. Cl.
CPC ............... G09G 5/006 (2013.01); G06T 9/00 (2013.01); H04N 19/12 (2014.11);
(Continued)

(58) Field of Classification Search
None
See application file for complete search history.

(56) References Cited

U.S. PATENT DOCUMENTS 6,784,891 B2   8/2004   Inuzuka et al.
6,992,676 B2   1/2006   Inuzuka et al.
(Continued)

FOREIGN PATENT DOCUMENTS

CN   101620842 A   1/2010
CN   101923824 A   12/2010
(Continued)

OTHER PUBLICATIONS

First Office Action, including Search Report, for Chinese Patent Application No. 201510478302.4, dated Aug. 28, 2017, 11 pages.
(Continued)

Primary Examiner — Joni Richer
(74) Attorney, Agent, or Firm — Westman, Champlin & Koehler, P.A.

(57) ABSTRACT

The present disclosure discloses a data transmission method, a data transmission system and a portable display device, relates to the technical field of display, and can reduce power consumption of the portable display device and improve battery endurance of the portable display device. The data transmission method comprises: compressing display data; transmitting the compressed display data; and decompress-
(Continued)

ing the compressed display data. The data transmission method and the data transmission system according to the present disclosure are used for data transmission between a processor and a source drive circuit in the portable display device.

18 Claims, 2 Drawing Sheets

(51) Int. Cl.
*H04N 19/172* (2014.01)
*G09G 5/00* (2006.01)
*G06T 9/00* (2006.01)
*H04W 52/02* (2009.01)

(52) U.S. Cl.
CPC ......... *H04N 19/156* (2014.11); *H04N 19/172* (2014.11); *G09G 2310/08* (2013.01); *G09G 2320/0673* (2013.01); *G09G 2330/021* (2013.01); *G09G 2350/00* (2013.01); *H04W 52/0261* (2013.01)

(56) References Cited

U.S. PATENT DOCUMENTS

| | | | |
|---|---|---|---|
| 7,912,304 B2 | 3/2011 | Furihata et al. | |
| 8,111,933 B2 | 2/2012 | Furihata et al. | |
| 8,385,668 B2 | 2/2013 | Furihata et al. | |
| 8,638,285 B2 | 1/2014 | Nose et al. | |
| 8,674,924 B2 | 3/2014 | Nose | |
| 8,923,636 B2 | 12/2014 | Furihata et al. | |
| 9,703,451 B2* | 7/2017 | Barger | G06F 3/0482 |
| 2006/0263078 A1* | 11/2006 | Misawa | G03B 17/02 396/287 |
| 2007/0080971 A1* | 4/2007 | Sung | G09G 3/20 345/545 |
| 2014/0098110 A1* | 4/2014 | Ju | G06T 9/00 345/501 |
| 2014/0104249 A1 | 4/2014 | Furihata et al. | |
| 2014/0192075 A1* | 7/2014 | Stamoulis | G09G 5/393 345/549 |
| 2015/0104109 A1* | 4/2015 | Ichitsubo | H04N 1/4078 382/233 |
| 2015/0325184 A1* | 11/2015 | Hsiao | H04N 19/30 345/204 |
| 2016/0329013 A1 | 11/2016 | Han et al. | |

FOREIGN PATENT DOCUMENTS

| | | |
|---|---|---|
| CN | 101996599 A | 3/2011 |
| CN | 103730092 A | 4/2014 |
| CN | 104407826 A | 3/2015 |
| EP | 1 237 144 A2 | 9/2002 |

OTHER PUBLICATIONS

International Search Report and Written Opinion of International Application No. PCT/CN2015/099200, dated Apr. 28, 2016, 8 pages.
English translation of Box No. V of the Written Opinion for the International Searching Authority for International Application No. PCT/CN2015/099200, 2 pages.

* cited by examiner

DATA TRANSMISSION METHOD, DATA TRANSMISSION SYSTEM AND PORTABLE DISPLAY DEVICE OF TRANSMITTING COMPRESSED DATA

CROSS-REFERENCE TO RELATED APPLICATION(S)

This application is a 371 National Stage Application of International Application No. PCT/CN2015/099200, filed on Dec. 28, 2015, which has not yet published, entitled "DATA TRANSMISSION METHOD, DATA TRANSMISSION SYSTEM AND PORTABLE DISPLAY DEVICE", and claims priority to Chinese Patent Application No. 201510478302.4, filed on Aug. 6, 2015, the contents of which are incorporated herein by reference in their entirety.

TECHNICAL FIELD

The present disclosure relates to the technical field of display, and particularly, to a data transmission method, a data transmission system and a portable display device.

BACKGROUND

Power consumption of a portable display device is one of main performance parameters thereof. For example, battery endurance of a smart phone directly depends on the power consumption of the smart phone. The higher the power consumption of the smart phone is, the weaker the battery endurance is, the shorter the battery life is, and the worse the use experience of the user has.

In conventional technical solutions, the power consumption of the smart phone is reduced mainly by improving a manufacture process of a CPU (Central Processing Unit) of the smart phone. The more advanced the manufacture process is, the higher the fineness of integrated circuits in CPU is, the larger the number of components which may be manufactured in a wafer of a unit area is, the smaller the area of the CPU is, the less the power consumption of CPU is, the less the power consumption of the smart phone is, and the stronger the battery endurance is.

However, inventors of the present disclosure found that improvements on the manufacture process of CPU may be limited by the current process technologies, and the fineness of the integrated circuits cannot be increased infinitely. Therefore, although the method of improving the manufacture process of CPU as described above can reduce the power consumption of the smart phone to some extent, improve the battery endurance of the smart phone, and extend the battery life, increasing requirements of the user on the battery life cannot be sufficiently satisfied.

SUMMARY

In view of this, an object of the present disclosure is to provide a data transmission method, a data transmission system and a portable display device for reducing the power consumption of the portable display device, and improving the battery endurance of the portable display device.

For this purpose, the data transmission method provided by the present disclosure uses a technical solution as follows.

The data transmission method is used for data transmission between a processor and a source drive circuit in a portable display device, the data transmission method comprising:

compressing display data;
transmitting the compressed display data; and
decompressing the compressed display data.

The present disclosure provides the data transmission method as described above. Since the compressed display data are transmitted in this data transmission method while display data which are not compressed are transmitted in the conventional technical solutions, data amount transmitted in the present disclosure is significantly reduced, compared to the conventional technical solutions; and thus a data transmission time may be reduced in a case that a data transmission rate remains unchanged; or the data transmission rate may be reduced in a case that the data transmission time remains unchanged. Therefore, the data transmission method in the present disclosure can effectively reduce the power consumption of the portable display device, enhance the battery endurance of the portable display device, extend the battery life of the portable display device, and improve the use experience of the user.

The present disclosure further provides a data transmission system, which uses a technical solution as follows.

The data transmission system is used for data transmission between a processor and a source drive circuit in a portable display device, the data transmission system comprising:

a compression module, configured to compress display data;
a transmission module with an input connected to an output of the compression module, and configured to transmit the compressed display data; and
a decompression module with an input connected to an output of the transmission module, and configured to decompress the compressed display data.

The present disclosure provides the data transmission system as described above. Since the compressed display data are transmitted by the compression module while display data which are not compressed are transmitted in the conventional technical solutions, data amount transmitted in the present disclosure is significantly reduced, compared to the conventional technical solutions; and thus a data transmission time may be reduced in a case that a data transmission rate remains unchanged; or the data transmission rate may be reduced in a case that the data transmission time remains unchanged. Therefore, the data transmission system in the present disclosure can effectively reduce the power consumption of the portable display device, enhance the battery endurance of the portable display device, extend the battery life of the portable display device, and improve the use experience of the user.

In addition, the present disclosure further provides a portable display device, which uses a technical solution as follows.

The portable display device comprises a processor, a source drive circuit and the data transmission system as described previously, an output of the processor being connected to the input of the compression module, and an output of the decompression module being connected to an input of the source drive circuit.

Since the portable display device provided by the present disclosure comprises the data transmission system previously described, the portable display device provided by the present disclosure has the same beneficial effects as the data transmission system previously described, which will not be described repeatedly here.

BRIEF DESCRIPTION OF THE DRAWINGS

In order to illustrate the technical solutions in the embodiments of the present invention more clearly, drawings used for description on the embodiments will be introduced simply. Obviously, the drawings are only for some embodiments of the present invention. Other embodiments may also be obtained according to these drawings by the skilled in the art without any creative effort.

DETAILED DESCRIPTION

Hereinafter, technical solutions in the embodiments of the present invention will be described clearly and completely, in connection with the drawings in the present invention. Obviously, the embodiments as described below are only some of embodiments of the present invention, but not all of the embodiments thereof. Based on the embodiments of the present invention, all of other embodiments obtained by the skilled in the art without any creative effort fall into the protection scope of the present invention.

Figure 1:
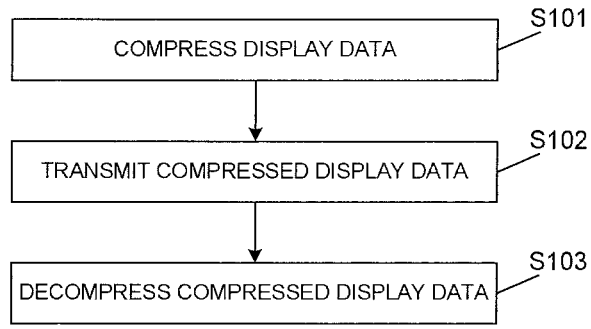
FIG. 1 is a flowchart of a data transmission method according to an embodiment of the present disclosure.

The present disclosure provides a data transmission method for data transmission between a processor and a source drive circuit in a portable display device. In particular, as shown in FIG. 1, the data transmission method comprises steps S101 to S103.

In step S101, display data are compressed.

Exemplarily, the above display data are display data output by the processor. In the embodiment of the present disclosure, the display data may be compressed in real time; or may be firstly stored and then compressed. If the display data are stored firstly, at least two sequential display data may be compared; if the at least two display data are identical, only one of these display data are needed to be compressed without having other display data compressed, which thus can effectively reduce data amount to be compressed, data amount transmitted subsequently and data amount to be decompressed, and can facilitate to reduce the power consumption of the portable display device, but may cause the data transmission method more complex. The skilled in the art may choose whether to do so as required in practice.

The lower a compression ratio for compressing the display data is, the smaller the size of the compressed display data is, but the lower a compression rate is. Therefore, it is very necessary to select an appropriate compression ratio for compressing the display data. The compression ratio for compressing the display data in the embodiment of the present disclosure may be selected as 15%~60%, so as to effectively balance a size and the compression rate of the compressed display data. Here, the compression ratio refers to a ratio of a size of compressed display data to a size of display data before compression.

In addition, the compression format for compressing the display data may be a lossless compression format or a loss compression format. Exemplarily, the lossless compression format may be APE, FLAC, TAC, WavPack or TTA, and of course may be other compression format which may take both the compression ratio and the compression rate into account; and the loss compression format may be mp3, divX, Xvid, jpeg, rm, rmvb, wma or wmv etc. Since the lossless compression format utilizes statistical redundancy of the display data for compressing the display data, the display data may be completely recovered after decompression without any distortion; but the compression ratio is larger, the size of the compressed display data is still larger, and the compression rate is lower. The loss compression format utilizes a characteristic of the human being not sensitive to some frequency components in an image or soundwave, which allows some information to be lost during compression, thus the compression ratio is smaller, the size of the compressed display data is smaller, and the compression rate is higher; but the display data cannot be completely recovered after decomposition.

In step S102, the compressed display data are transmitted.

Exemplarily, in the embodiment of the present disclosure, the compressed display data may be transmitted in real time, or may be firstly stored and then transmitted, which are not limited in the embodiment of the present disclosure.

In step S103, the compressed display data are decompressed.

As known by the skilled in the art, the way of decompressing the compressed display data is necessarily selected accordingly according to the particular compression format for compressing the display data in step S101, which will not be described repeatedly here. In addition, decompressing the compressed display data and transmitting the decompressed display data (for example, to the source drive circuit) may be performed synchronously.

The present disclosure provides the data transmission method as described above. Since the compressed display data are transmitted in this data transmission method while display data which are not compressed are transmitted in the conventional technical solutions, data amount transmitted in the present disclosure is significantly reduced, compared to the conventional technical solutions; and thus a data transmission time may be reduced in a case that a data transmission rate remains unchanged; or the data transmission rate may be reduced in a case that the data transmission time remains unchanged. Therefore, the data transmission method in the present disclosure can effectively reduce the power consumption of the portable display device, enhance the battery endurance of the portable display device, extend the battery life of the portable display device, and improve the use experience of the user.

Since compared to the convention technical solutions, the data amount transmitted in the data transmission method according to the embodiment of the present disclosure is significantly reduced, not only the power consumption of the portable display device may be reduced as previously described, but also a bit error rate of transmitting the display data may be reduced, and requirements on hardware may be reduced. For example, the number of pairs of MIPIs (Mobile Industry Processor Interface) for transmitting the display data may be appropriately reduced, areas of the processor and a FPC (Flexible Printed Circuit board) between the processor and the source drive circuit may be reduced accordingly, and an occupied volume of a connector for connecting the FPC and the processor also may be reduced.

Hereinafter, an embodiment of the present disclosure provides a particular approach of selecting the compression format and the compression ratio during compression of the display data.

As known from the above, when the display data are compressed, the size of the compressed display data has a close relationship with the compression format and the compression ratio. When the lossless compression format is selected for compressing the display data, the size of the compressed display data is larger, and the compression ratio is larger; while when the loss compression format is selected for compressing the display data, the size of the compressed display data is smaller, and the compression ratio is smaller. The amount of transmitted data depends on the size of the compressed display data which in turn affects the power consumption of the portable display device. For the portable display device, when the battery level becomes lower, if the power consumption of the portable display device can be reduced accordingly as the battery level becomes lower, the battery endurance of the portable display device can be effectively improved, and the battery life of the portable display device can be extended. Therefore, in a preferred embodiment of the present disclosure, before the display data are compressed, the battery level of the portable display device is diagnosed. Here, the step of compressing the display data further comprises: selecting the compression ratio according to the battery level of the portable display device, and compressing the display data in the selected compression format and compression ratio, so that the size of the compressed display data can be adjusted in real time with the variation of the battery level of the portable display device, and the power consumption of the portable display device also can be adjusted in real time. Thus, the battery endurance of the portable display device can be effectively improved, and the battery life of the portable display device can be extended.

Further, as known from the above, when the lossless compression format is selected for compressing the display data, the size of the compressed display data is larger; while when the loss compression format is selected for compressing the display data, the size of the compressed display data is smaller. Therefore, the step of selecting the compression format according to the battery level of the portable display device may further comprise: determining whether the battery level of the portable display device is lower than a preset value; and selecting the lossless compression format if the battery level of the portable display device is no lower than the preset value; and selecting the loss compression format if the battery level of the portable display device is lower than the preset value. The preset value may be 20% of a full battery level or other value, which may be set by the skilled in the art according to actual requirements, and will not be limited in the embodiment of the present disclosure.

Figure 2:
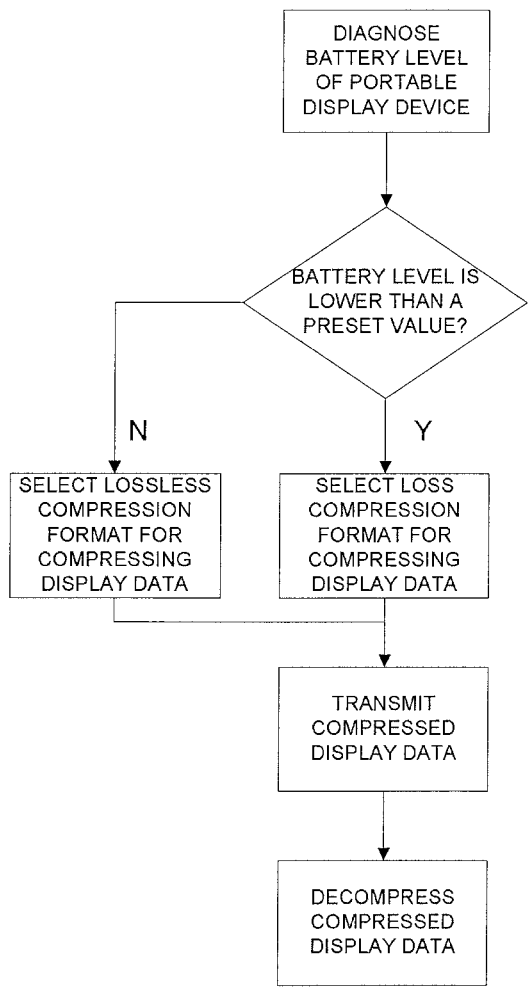
FIG. 2 is a flowchart of another data transmission method according to an embodiment of the present disclosure.

In particular, as shown in FIG. 2, the data transmission method in the embodiment of the present disclosure further comprises: firstly, diagnosing the battery level of the portable display device; then, determining whether the battery level is lower than the preset value; selecting the loss compression format for compressing the display data if the battery level is lower than the preset value; and selecting the lossless compression format for compressing the display data if the battery level of the portable display device is no lower than the preset value; next, transmitting the compressed display data; and finally, decompressing the compressed display data.

Alternatively, after the battery level of the portable display device is diagnosed, the step of compressing the display data may further comprise: selecting a compression ratio according to the battery level of the portable display device, and compressing the display data in the selected compression ratio, so that the size of the compressed display data can be adjusted in real time with the variation of the battery level of the portable display device, and the power consumption of the portable display device also can be adjusted in real time. Thus, the battery endurance of the portable display device can be effectively improved, and the battery life of the portable display device can be extended. In a preferred embodiment of the present disclosure, after the compression format is selected according to the battery level of the portable display device, the compression ratio is selected according to the battery level of the portable display device, compressing the display data in the selected compression format and compression ratio, improving the battery endurance of the portable display device and extending the battery life of the portable display device to the most extent.

Further, as known from the above, the larger the compression ratio for compressing the display data, the larger the size of the compressed display data is, and the higher the power consumption of the portable display device is; while the smaller the compression ratio for compressing the display data is, the smaller the size of the compressed display data is, and the lower the power consumption of the portable display device is. Therefore, in a preferred embodiment of the present disclosure, the step of selecting the compression ratio according to the battery level of the portable display device further comprises: selecting a smaller compression ratio as the battery level of the portable display device becomes lower, so that the size of the compressed display data is smaller, and the power consumption of the portable display device is lower.

Figure 3:
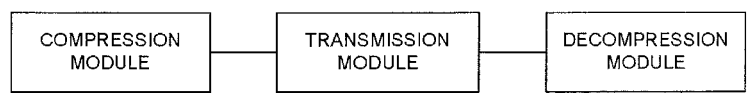
FIG. 3 is a schematic diagram of a data transmission system according to an embodiment of the present disclosure.

An embodiment of the present disclosure further provides a data transmission system for data transmission between a processor and a source drive circuit in a portable display device. As shown in FIG. 3, the data transmission system further comprises: a compression module, a transmission module and a decompression module.

Hereinafter, respective modules in the embodiment of the present disclosure will be described in detail.

The compression module is used for compressing display data. The above display data are display data output by the processor. In the embodiment of the present disclosure, the display data output by the processor may be compressed by the compression module in real time. The data transmission system may further comprise a storage module configured to store the display data output by the processor, with an input connected to an output of the processor and an output connected to an input of the compression module. Thus, the storage module may store the display data first, and then the compression module compresses the display data stored in the storage module. Here, before the compression module compresses the display data, at least two adjacent display data which are stored sequentially may be compared; if the at least two display data are identical, only one of these display data are needed to be compressed by the compression module without having other display data compressed, which thus can effectively reduce data amount to be compressed by the compression module, data amount transmitted by the transmission module and data amount to be decompressed by the decompression module, and can facilitate to reduce the power consumption of the portable display device, but may cause the data transmission method more complex. The skilled in the art may choose whether to do so as required in practice.

The lower a compression ratio for compressing the display data is, the smaller the sizes of the compressed display data is, but the lower a compression rate is. Therefore, it is very necessary to select an appropriate compression ratio when the compression module compresses the display data. The compression ratio for compressing the display data by the compression module in the embodiment of the present disclosure may be selected as 15%~60%, so as to effectively balance a size and the compression rate of the compressed display data.

In addition, the compression format for compressing the display data by the compression module may be a lossless compression format or a loss compression format. Exemplarily, the lossless compression format may be APE, FLAC, TAC, WavPack or TTA, and of course may be other compression format which may take both the compression ratio and the compression rate into account; and the loss compression format may be mp3, divX, Xvid, jpeg, rm, rmvb, wma or wmv etc.

The transmission module is configured to transmit the compressed display data, with an input connected to an output of the compression module. Exemplarily, the transmission module comprises MIPIs (Mobile Industry Processor Interfaces). The larger the data amount the transmission module needs to transmit, the larger the number of pairs of the MIPI interfaces is.

The decompression module is configured to decompress the compressed display data, with an input connected to an output of the transmission module. As known by the skilled in the art, the way of decompressing the compressed display data by the decompression module is necessarily selected accordingly according to the particular compression format for compressing the display data by the compression module, which will not be described repeatedly here.

The present disclosure provides the data transmission system as described above. Since it is the compressed display data that are transmitted in the transmission module while it is display data which are not compressed that are transmitted in the conventional technical solutions, data amount transmitted in the present disclosure is significantly reduced, compared to the conventional technical solutions; and thus a data transmission time may be reduced in a case that a data transmission rate remains unchanged; or the data transmission rate may be reduced in a case that the data transmission time remains unchanged. Therefore, the data transmission system in the present disclosure can effectively reduce the power consumption of the portable display device, enhance the battery endurance of the portable display device, extend the battery life of the portable display device, and improve the use experience of the user.

Since compared to the convention technical solutions, the data amount transmitted in the data transmission system according to the embodiment of the present disclosure is significantly reduced, not only the power consumption of the portable display device may be reduced as previously described, but also a bit error rate of transmitting the display data may be reduced, and requirements on hardware may be reduced. For example, the number of pairs of MIPIs for transmitting the display data may be appropriately reduced, areas of the processor and a FPC (Flexible Printed Circuit board) between the processor and the source drive circuit may be reduced accordingly, and an occupied volume of a connector for connecting the FPC and the processor also may be reduced.

Hereinafter, an embodiment of the present disclosure provides a particular approach of how to select the compression format and the compression ratio during the compression module compresses the display data.

As known from the above embodiment, when the compression module compresses the display data, the size of the compressed display data has a close relationship with the compression format and the compression ratio. When the lossless compression format is selected by the compression module for compressing the display data, the size of the compressed display data is larger, and the compression ratio is larger; while when the loss compression format is selected by the compression module for compressing the display data, the size of the compressed display data is smaller, and the compression ratio is smaller. The amount of transmitted data depends on the size of the compressed display data which in turn affects the power consumption of the portable display device. For the portable display device, when the battery level becomes lower, if the power consumption of the portable display device can be reduced accordingly as the battery level becomes lower, the battery endurance of the portable display device can be effectively improved, and the battery life of the portable display device can be extended. Therefore, in a preferred embodiment of the present disclosure, the data transmission system further comprises a battery level diagnosis module configured to diagnose the battery level of the portable display device, with an output connected to the input of the compression module. Here, the compression module comprises a compression format selection unit configured to select a compression format for compressing the display data according to the battery level of the portable display device, so that the size of the display data compressed by the compression module can be adjusted in real time with the variation of the battery level of the portable display device, and the power consumption of the portable display device also can be adjusted in real time. Thus, the battery endurance of the portable display device can be effectively improved, and the battery life of the portable display device can be extended.

Further, as known from the above, when the lossless compression format is selected by the compression module for compressing the display data, the size of the compressed display data is larger; while when the loss compression format is selected by the compression module for compressing the display data, the size of the compressed display data is smaller. Therefore, the compression format selection unit in the embodiment of the present disclosure is further configured to determine whether the battery level of the portable display device is lower than a preset value; and select the lossless compression format if the battery level of the portable display device is no lower than the preset value; and select the loss compression format if the battery level of the portable display device is lower than the preset value.

Alternatively, the compression module further comprises a compression ratio selection unit for selecting a compression ratio for compression the display data according to the battery level of the portable display device, and compressing the display data in the selected compression ratio, so that the size of the compressed display data can be adjusted in real time with the variation of the battery level of the portable display device, and the power consumption of the portable display device also can be adjusted in real time. Thus, the battery endurance of the portable display device can be effectively improved, and the battery life of the portable display device can be extended. In a preferred embodiment of the present disclosure, after the compression format is selected by the compression format selection unit according to the battery level of the portable display device, the compression ratio is selected by the compression format selection unit according to the battery level of the portable display device, so that the compression module compresses the display data in the selected compression format and compression ratio, improving the battery endurance of the portable display device and extending the battery life of the portable display device to the most extent.

Further, as known from the above, the larger the compression ratio for compressing the display data by the compression module, the larger the size of the display data compressed by the compression module is, and the higher the power consumption of the portable display device is;

while the smaller the compression ratio for compressing the display data by the compression module is, the smaller the size of the display data compressed by the compression module is, and the lower the power consumption of the portable display device is. Therefore, in a preferred embodiment of the present disclosure, the compression ratio selection unit is further configured to select a smaller compression ratio as the battery level of the portable display device becomes lower, so that the size of the compressed display data is smaller, and the power consumption of the portable display device is lower.

Figure 4:
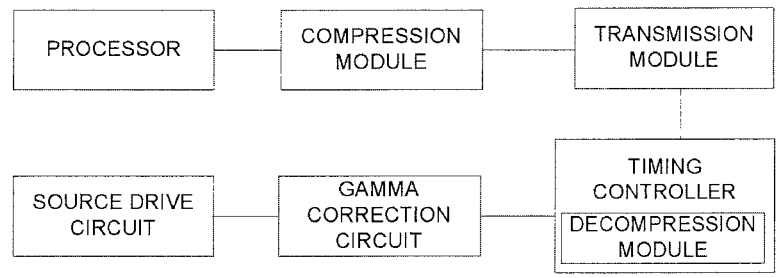
FIG. 4 is a schematic diagram of a portable display device according to an embodiment of the present disclosure.

An embodiment of the present disclosure further provides a portable display device. As shown in FIG. 4, the portable display device comprises a processor, a source drive circuit and the data transmission system as previously described. An output of the processor is connected to the input of the compression module, and the output of the decompression module is connected to an input of the source drive circuit. The above processor may be CPU or DSP (Digital Signal Processor). Since the portable display device provided by the embodiment of the present disclosure comprises the data transmission system as described in the above embodiments, the portable display device provided by the present disclosure has beneficial effects which are identical with those of the data transmission system as described in the above embodiment, which will not be repeatedly described here.

Alternatively, the portable display device in the embodiment of the present disclosure further comprises a timing controller with an input connected to the output of the transmission module and an output connected to the input of the source drive circuit. Here, the decompression module as described above may be directly integrated in the timing controller, and the decompressed display data may be output directly by the timing controller, so as to simplify the structure of the portable display device.

The portable display device in the embodiment of the present disclosure may further comprise a gamma correction circuit with an input connected to the output of the decompression module and an output connected to the input of the source drive circuit. The gamma correction circuit may perform gamma correction on the decompressed display data, so that the display data may be reproduced as brightness of pixels accurately.

In addition, the portable display device in the embodiment of the present disclosure necessarily further comprises a display module and a gate drive circuit etc. Structures and connection relationships of the display module and the gate drive circuit are the same with those in the conventional technical solutions, which thus will not be repeatedly described here.

According to the above description on the implementations, the skilled in the art may understand clearly that the present invention may be implemented by means of software and necessary general-purpose hardware. Of course, the present invention may also be implemented by hardware. However, the former implementation is preferred in most cases. Based on such understandings, the technical solutions of the present invention or a part thereof contributing to the prior art may substantially be embodied in a form of a software product. The computer software product may be stored in a readable storage medium, such as a floppy disk, a hard disk or an optical disk of the computer etc., including several instructions for causing the computer device (which may be a PC, a server or a network device etc.) to execute the methods of various embodiments in the present invention.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A data transmission method for data transmission between a processor and a source drive circuit in a portable display device, the data transmission method comprising:
   at the processor side:
   diagnosing a battery level of the portable display device;
   selecting a compression format according to the battery level of the portable display device in the selected compression format;
   compressing the display data in the selected compression format, such that the lower the battery level of the portable display device is, the smaller the size of the compressed display data is; and
   transmitting the compressed display data to the source drive circuit side; and
   at the source driver circuit side:
   decompressing the compressed display data; and
   delivering the decompressed display data to the source drive circuit.

2. The data transmission method according to claim 1, wherein a compression format for compressing the display data is a lossless compression format or a loss compression format.

3. The data transmission method according to claim 2, wherein the lossless compression format is Monkey's Audio (APE), Free Lossless Audio Codec (FLAC), Tencent Audio Coding (TAC), WavPack or True Audio (TTA); and the loss compression format is Moving Picture Expert Group Audio Layer III (mp3), Digital Video Express (divX), Xvid, Joint Photographic Experts Group (jpeg), Real Media (rm), Real Media Variable Bitrate (rmvb), Windows Media Audio (wma) or Windows Media Video (wmv).

4. The data transmission method according to claim 1, wherein selecting the compression format according to the battery level of the portable display device further comprises:
   determining whether the battery level of the portable display device is lower than a preset value; and
   selecting the lossless compression format if the battery level of the portable display device is no lower than the preset value; and selecting the loss compression format if the battery level of the portable display device is lower than the preset value.

5. The data transmission method according to claim 4, wherein compressing the display data further comprises: after the compression format is selected according to the battery level of the portable display device, selecting a compression ratio according to the battery level of the portable display device, and compressing the display data in the selected compression format and compression ratio.

6. The data transmission method according to claim 1, wherein compressing the display data further comprises: after the compression format is selected according to the battery level of the portable display device, selecting a compression ratio according to the battery level of the portable display device, and compressing the display data in the selected compression format and compression ratio.

7. The data transmission method according to claim 6, wherein selecting the compression ratio according to the battery level of the portable display device comprises: selecting a smaller compression ratio as the battery level of the portable display device becomes lower.

8. The data transmission method according to claim 1, wherein a compression ratio of compressing the display data is within 15%-60%.

9. A data transmission system for data transmission between a processor and a source drive circuit in a portable display device, the data transmission system comprising:
at the processor side,
a battery level diagnosis module configured to diagnose a battery level of the portable display device;
a compression format selection unit configured to select a compression format for compressing the display data according to the battery level of the portable display device;
a compression module, configured to compress the display data in the selected compression format, such that the lower the battery level of the portable display device is, the smaller the size of the compressed display data is; and
a transmission module with an input connected to an output of the compression module, and configured to transmit the compressed display data to the source driver circuit side; and
at the source driver circuit side,
a decompression module with an input connected to an output of the transmission module, and configured to decompress the compressed display data and output the decompressed display data to the source drive circuit.

10. The data transmission system according to claim 9, wherein a compression format for compressing the display data by the compression module is a lossless compression format or a loss compression format.

11. The data transmission system according to claim 10, wherein the lossless compression format is Monkey's Audio (APE), Free Lossless Audio Codec (FLAC), Tencent Audio Coding (TAC), WavPack or True Audio (TTA); and the loss compression format is Moving Picture Expert Group Audio Layer III (mp3), Digital Video Express (divX), Xvid, Joint Photographic Experts Group (jpeg), Real Media (rm), Real Media Variable Bitrate (rmvb), Windows Media Audio (wma) or Windows Media Video (wmv).

12. The data transmission system according to claim 9, wherein the compression format selection unit is further configured to:
determine whether the battery level of the portable display device is lower than a preset value; and
select the lossless compression format if the battery level of the portable display device is no lower than the preset value; and select the loss compression format if the battery level of the portable display device is lower than the preset value.

13. The data transmission system according to claim 9, wherein the compression module further comprises a compression ratio selection unit, configured to select a compression ratio for compressing the display data according to the battery level of the portable display device.

14. The data transmission system according to claim 13, wherein the compression ratio selection unit is further configured to select a smaller compression ratio as the battery level of the portable display device becomes lower.

15. The data transmission system according to claim 9, wherein a compression ratio of compressing the display data by the compression module is within 15%~60%.

16. A portable display device, comprising a processor, a source drive circuit and the data transmission system according to claim 9, an output of the processor being connected to the input of the compression module, and an output of the decompression module being connected to an input of the source drive circuit.

17. The portable display device according to claim 16, further comprising: a timing controller with an input connected to the output of the transmission module and an output connected to the input of the source drive circuit, the decompression module being integrated in the timing controller.

18. The portable display device according to claim 16, further comprising: a gamma correction circuit with an input connected to the output of the decompression module and an output connected to the input of the source drive circuit.

* * * * *